United States Patent
Awtar et al.

(10) Patent No.: US 8,382,119 B2
(45) Date of Patent: *Feb. 26, 2013

(54) COMPLIANT PLATE SEALS FOR TURBOMACHINERY

(75) Inventors: Shorya Awtar, Ann Arbor, MI (US); Nikhil Kumar Verma, Karnataka (IN)

(73) Assignee: General Electric Company, Schenectady, NY (US)

( * ) Notice: Subject to any disclaimer, the term of this patent is extended or adjusted under 35 U.S.C. 154(b) by 991 days.

This patent is subject to a terminal disclaimer.

(21) Appl. No.: 12/140,708

(22) Filed: Jun. 17, 2008

(65) Prior Publication Data

US 2008/0272553 A1    Nov. 6, 2008

Related U.S. Application Data

(63) Continuation-in-part of application No. 11/504,061, filed on Aug. 15, 2006, now Pat. No. 7,419,164.

(51) Int. Cl.
*F16J 15/44* (2006.01)

(52) U.S. Cl. .................................................. 277/355

(58) Field of Classification Search .............. 277/355, 277/412, 418–420
See application file for complete search history.

(56) References Cited

U.S. PATENT DOCUMENTS

| | | | |
|---|---|---|---|
| 1,996,779 A | 4/1935 | Wheeler | |
| 4,526,509 A | 7/1985 | Gay, Jr. et al. | |
| 5,135,237 A | 8/1992 | Flower | |
| 5,474,306 A | 12/1995 | Bagepalli et al. | |
| 5,749,584 A | 5/1998 | Skinner et al. | |
| 5,755,445 A | 5/1998 | Arora | |
| 6,010,132 A | 1/2000 | Bagepalli et al. | |
| 6,220,602 B1 | 4/2001 | Webster et al. | |
| 6,257,586 B1 | 7/2001 | Skinner et al. | |
| 6,267,381 B1 | 7/2001 | Wright | |
| 6,343,792 B1 | 2/2002 | Shinohara et al. | |
| 6,428,009 B2 | 8/2002 | Justak | |
| 6,553,639 B2 | 4/2003 | Hobbs et al. | |
| 6,644,667 B2 | 11/2003 | Grondahl | |
| 6,736,597 B2 * | 5/2004 | Uehara et al. | 415/174.2 |
| 6,786,488 B2 | 9/2004 | Laurello et al. | |
| 6,860,484 B2 | 3/2005 | Urlichs | |
| 6,874,788 B2 | 4/2005 | Kono | |
| 6,935,631 B2 | 8/2005 | Inoue | |

(Continued)

FOREIGN PATENT DOCUMENTS

| | | |
|---|---|---|
| EP | 0 391 676 | 10/1990 |
| EP | 1 235 009 | 8/2002 |

(Continued)

OTHER PUBLICATIONS

Nakane, H. et al., "The Development of High Performance Leaf Seals," Proceedings of ASME Turbo Expo 2002, Jun. 3-6, 2002, Amsterdam, Netherlands, pp. 1-9.

(Continued)

*Primary Examiner* — Vishal Patel
(74) *Attorney, Agent, or Firm* — Nixon & Vanderhye P.C.

(57) ABSTRACT

A shaft seal serves to reduce leakage between a rotating shaft and a static shell. The shaft seal includes a plurality of compliant plate members, each having a root and a tip. The compliant plate members are secured to one of the static shell and the rotating shaft at their root in facing relation. The tips of the compliant plate members define a sealing ring between the static shell and the rotating shaft. An axial flow resistance member is disposed within the compliant plate members and serves as a barrier to axial leakage flow between the compliant plate members.

21 Claims, 7 Drawing Sheets

U.S. PATENT DOCUMENTS

| | | |
|---|---|---|
| 6,976,680 B2 | 12/2005 | Uehara et al. |
| 7,066,468 B2 | 6/2006 | Uehara et al. |
| 7,159,872 B2 | 1/2007 | Nicholson et al. |
| 7,201,378 B2 | 4/2007 | Kono |
| 7,226,053 B2 * | 6/2007 | Nakano et al. ............ 277/355 |
| 7,419,164 B2 * | 9/2008 | Awtar et al. ............. 277/418 |
| 7,651,101 B2 * | 1/2010 | Awtar et al. ............. 277/412 |
| 2003/0062686 A1 | 4/2003 | Uehara et al. |
| 2004/0256810 A1 | 12/2004 | Nakano et al. |
| 2005/0194745 A1 | 9/2005 | Hogg |
| 2006/0033285 A1 | 2/2006 | Nishimoto et al. |
| 2006/0208427 A1 | 9/2006 | Wright et al. |
| 2006/0210392 A1 | 9/2006 | Enderby |
| 2007/0018408 A1 | 1/2007 | Kono |
| 2008/0042366 A1 * | 2/2008 | Awtar et al. ............. 277/411 |

FOREIGN PATENT DOCUMENTS

| | | |
|---|---|---|
| EP | 1 302 708 | 4/2003 |
| EP | 0 933 567 | 11/2006 |
| EP | 1 479 952 | 1/2007 |
| FR | 2 650 048 | 1/1991 |

OTHER PUBLICATIONS

Nakane, H. et al., "The Development of High-Performance Leaf Seals," Transactions of the ASME, Journal of Engineering for Gas Turbines and Power, vol. 126, Apr. 2004, pp. 342-350.

Watanabe, Eiichiro et al., "Development of New High Efficiency Steam Turbine," Mitsubishi Heavy Industries, Ltd. Technical Review, vol. 40, No. 4, Aug. 2003, pp. 1-6.

* cited by examiner

COMPLIANT PLATE SEALS FOR TURBOMACHINERY

CROSS REFERENCES TO RELATED APPLICATIONS

This application is a continuation-in-part of U.S. patent application Ser. No. 11/504,061, filed Aug. 15, 2006 now U.S. Pat. No. 7,419,164, the entire contents of which is hereby incorporated by reference in this application.

BACKGROUND OF THE INVENTION

The invention relates to a sealing structure between a rotating component and a static component and, more particularly, to a compliant plate seal arrangement that additionally utilizes features of a labyrinth seal.

Dynamic sealing between a rotor (e.g., rotating shaft) and a stator (e.g., static shell or casing) is an important concern in turbomachinery. Several methods of sealing have been proposed in the past. In particular, sealing based on flexible members has been utilized including seals described as leaf seals, brush seals, finger seals, shim seals, etc.

A brush seal is comprised of tightly packed generally cylindrical bristles that are effective in preventing leakage because of their staggered arrangement. The bristles have a low radial stiffness that allows them to move out of the way in the event of a rotor excursion while maintaining a tight clearance during steady state operation. Brush seals, however, are effective only up to a certain pressure differential across the seal. Because of the generally cylindrical geometry of the bristles, the brush seals tend to have a low stiffness in the axial direction, which limits the maximum operable pressure differential to generally less than 1000 psi.

To overcome this problem, leaf seals have been proposed that include a plate-like geometry with higher axial stiffness and therefore the capability of handling large pressure differentials (an exemplary conventional leaf seal is illustrated on the left side of FIG. 1). Axial leakage, however, remains a problem due to the leaf seal geometry. That is, if the leaves are packaged tightly close to the rotor, there will be gaps at the leaf roots since the seal is curved, which gaps potentially cause leakage and in turn offset the benefits of the seal.

BRIEF DESCRIPTION OF THE INVENTION

In an exemplary embodiment of the invention, a shaft seal reduces leakage between a rotating shaft and a static shell. The shaft seal includes a plurality of compliant plate members attached in facing relation to one of the static shell and the rotating shaft, where the compliant plate members define a sealing ring between the static shell and the rotating shaft. Each of the compliant plate members includes at least one slot therein. The shaft seal also includes at least one slot ring attached to at least one of the static shell and the rotating shaft and extending radially into the at least one slot in the compliant plate members.

In another exemplary embodiment of the invention, the shaft seal includes a plurality of compliant plate members, each having a root and a tip, where the compliant plate members are secured at their roots in facing relation to one of the static shell and the rotating shaft. The tips of the compliant plate members are arranged circumferentially about the rotating shaft or about the static shell, depending on whether the compliant plate members are secured to the static shell or the rotating shaft, respectively. An axial flow resistance member is disposed within the compliant plate members and serves as a barrier to axial leakage flow between the compliant plate members.

In still another exemplary embodiment of the invention, the shaft seal includes a plurality of compliant plate members attached in facing relation to one of the stator and the rotating shaft, the compliant plate members defining a sealing ring between the stator and the rotor. Each of the compliant plate members includes a plurality of varying length slots therein. A corresponding plurality of slot rings are attached to at least one of the stator and the rotating shaft and extend radially into the plurality of slots in the compliant plate members, respectively. The plurality of slot rings have varying radial lengths corresponding to the varying length slots and serve as a barrier to axial leakage flow between the compliant plate members.

DETAILED DESCRIPTION OF THE INVENTION

The improved compliant plate seal described herein achieves a structure that curtails the above-mentioned axial leakage seen in a conventional leaf seal by employing a geometry that includes features of a labyrinth seal. As noted, in a conventional leaf seal, because the leaves are packed tightly at the tips and loosely at the roots, axial leakage entering the leaf pack tends to flow/expand radially outward, then axially and finally converges as it exits the leaf pack.

Figure 1:
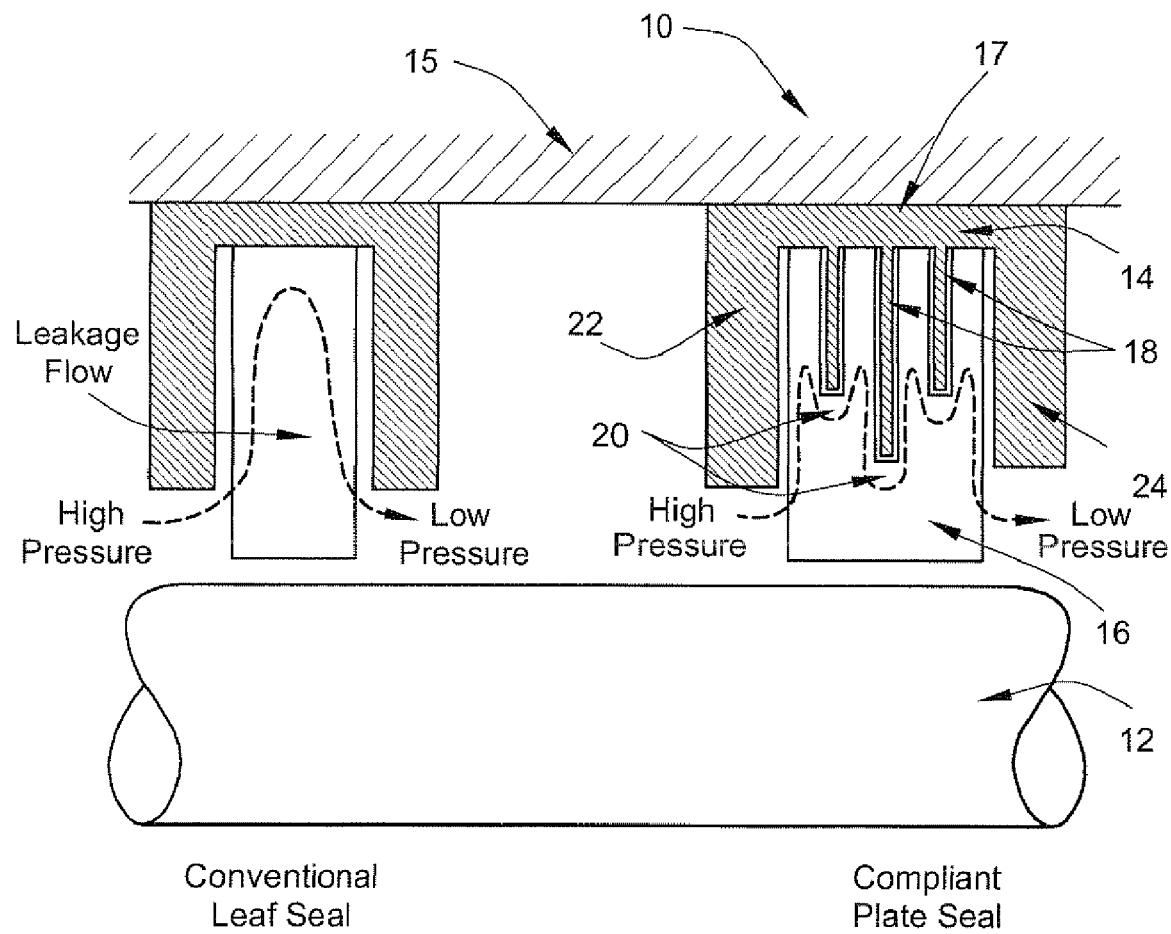
FIG. 1 is a cross sectional view showing a side-by-side comparison of a conventional leaf seal (left) to one embodiment of a compliant plate seal described herein (right)
Figure 2:
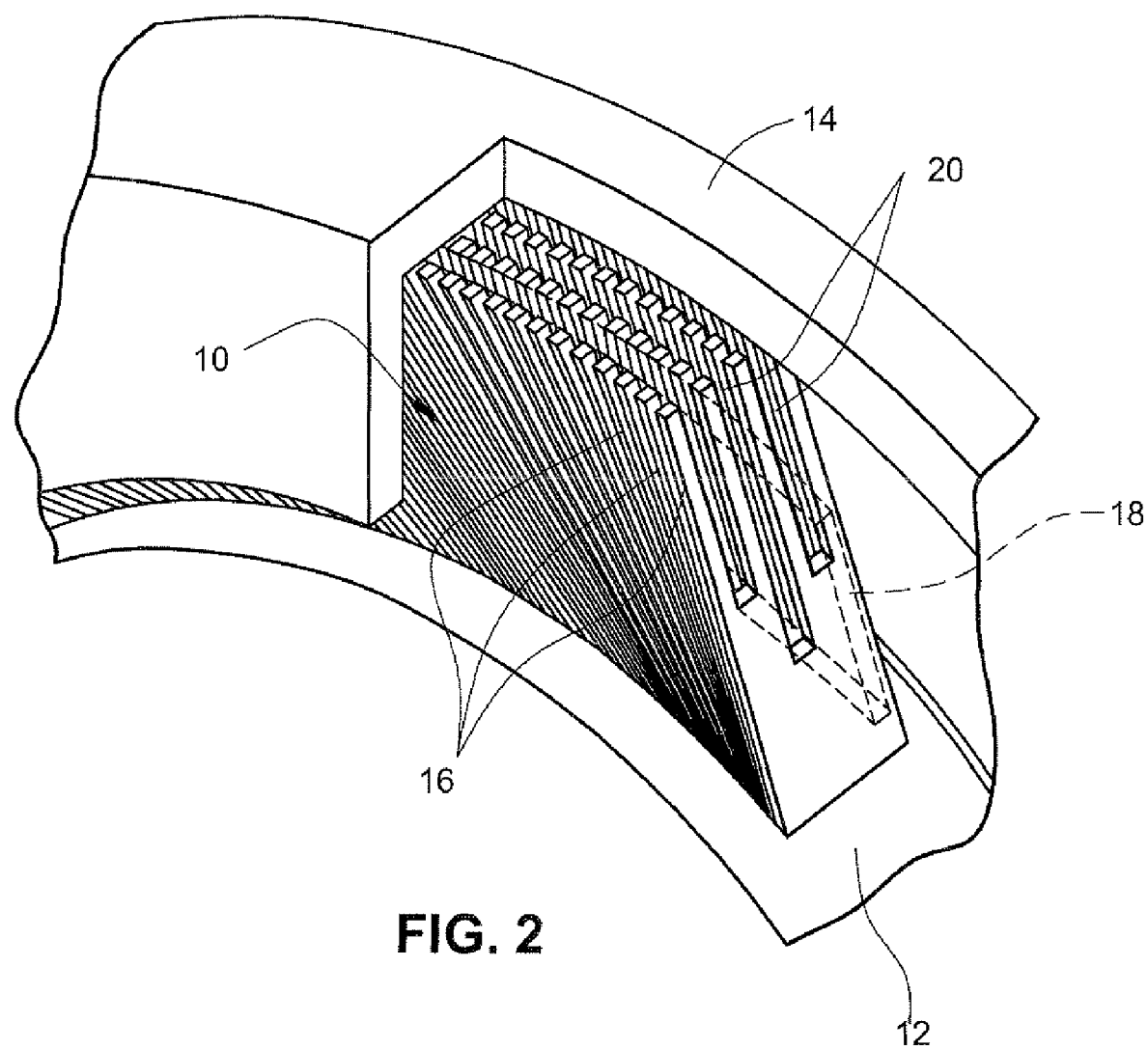
FIG. 2 is a perspective view of the compliant plate seal shown in FIG. 1.

With reference to FIGS. 1 and 2, a shaft seal 10 serves to reduce axial leakage between a rotor 12, such as a rotating shaft, and a housing 14, attached to the turbine static shell 15. The shaft seal 10 is provided with a plurality of compliant plate members 16 secured at their roots in facing relation (i.e., face-to-face) to the housing 14. The compliant plate members 16 define a sealing ring between the housing 14 and the rotating shaft 12.

An axial flow resistance member 17 is disposed within the compliant plate members 16 and serves as a barrier to axial leakage flow between the compliant plate members 16. In a preferred arrangement, the axial flow resistance member 17 includes at least one ring 18 attached to the housing 14 and extending radially into a corresponding at least one circumferential slot 20 in the compliant plate members 16. As depicted in FIGS. 1 and 2, each of the compliant plate members 16 preferably includes multiple slots 20 that can be of varying radial lengths and axial widths, and the axial flow resistance member 17 includes corresponding multiple static or slot rings 18 of corresponding radial lengths, respectively. Although three rings and slots are shown in FIG. 1, this depiction is exemplary, and the invention is not meant to be limited. In a broader sense, in some applications, adjacent ones of the circumferential slots 20 comprise different radial lengths with the rings 18 extending radially into the circumferential slots 20.

Figure 3:
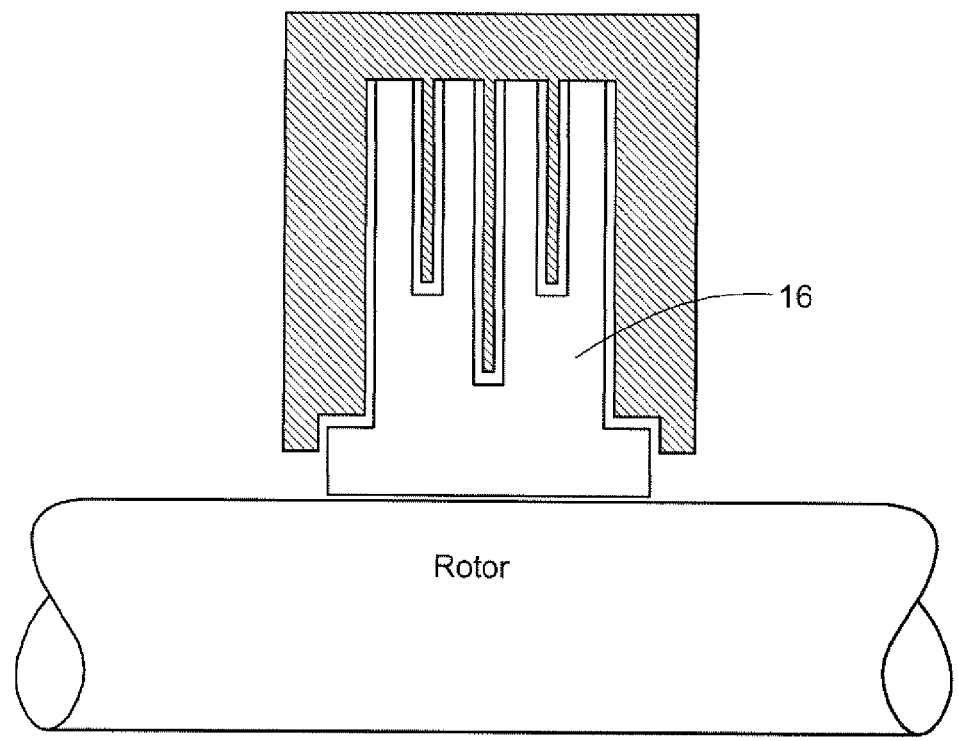
FIGS. 3 and 4 show alternate shapes for the complaint plate members.
Figure 4:
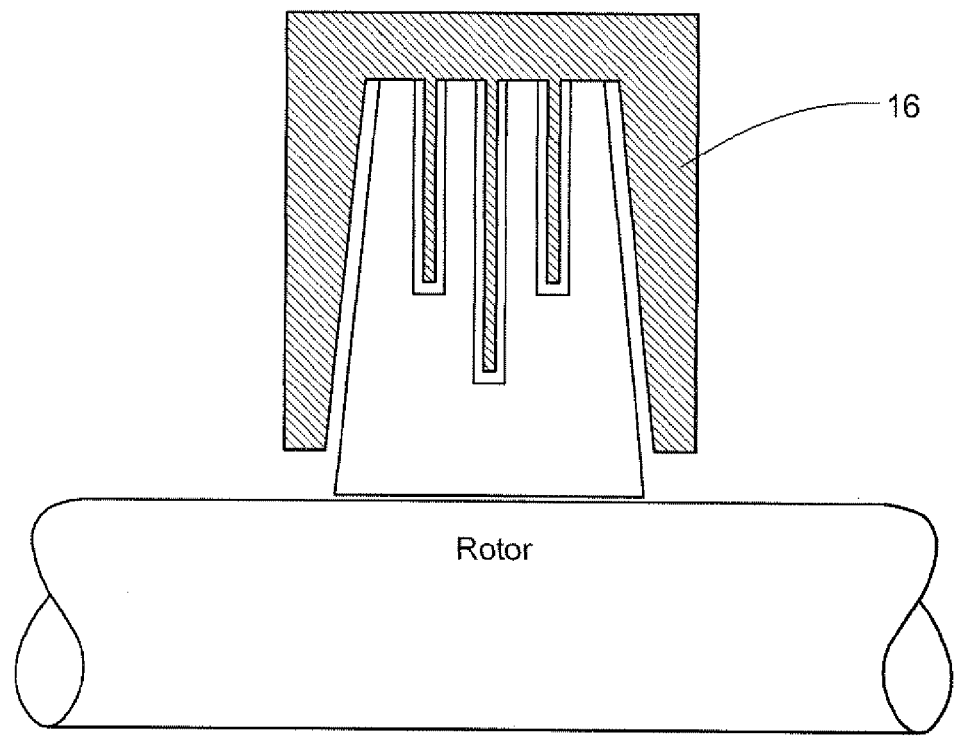

Although the illustrated slots 20 are shown having a rectangular shape, those of ordinary skill in the art will appreciate that other shaped slots may be utilized. The slots 20 may also be formed in different widths and varying lengths. Other compliant plate shapes may also be suitable, such as T-shaped, trapezoidal, and the like as shown in FIGS. 3 and 4.

The rings 18 force the leakage flow to follow a more tortuous path, thereby increasing the resistance to leakage flow. The configuration thus mimics a labyrinth seal within a compliant plate seal. The leaves retain their bending flexibility and axial stiffness, which are important for the seal functionality.

Since the compliant plates are packed more tightly at the tips (adjacent the rotor in this embodiment) than at the roots (adjacent the stator in this embodiment), the rings 18 need not extend radially from the plate root all the way to the plate tip. Rather, the rings 18 need only extend into a portion of the compliant plates 16 as shown.

Figure 5:
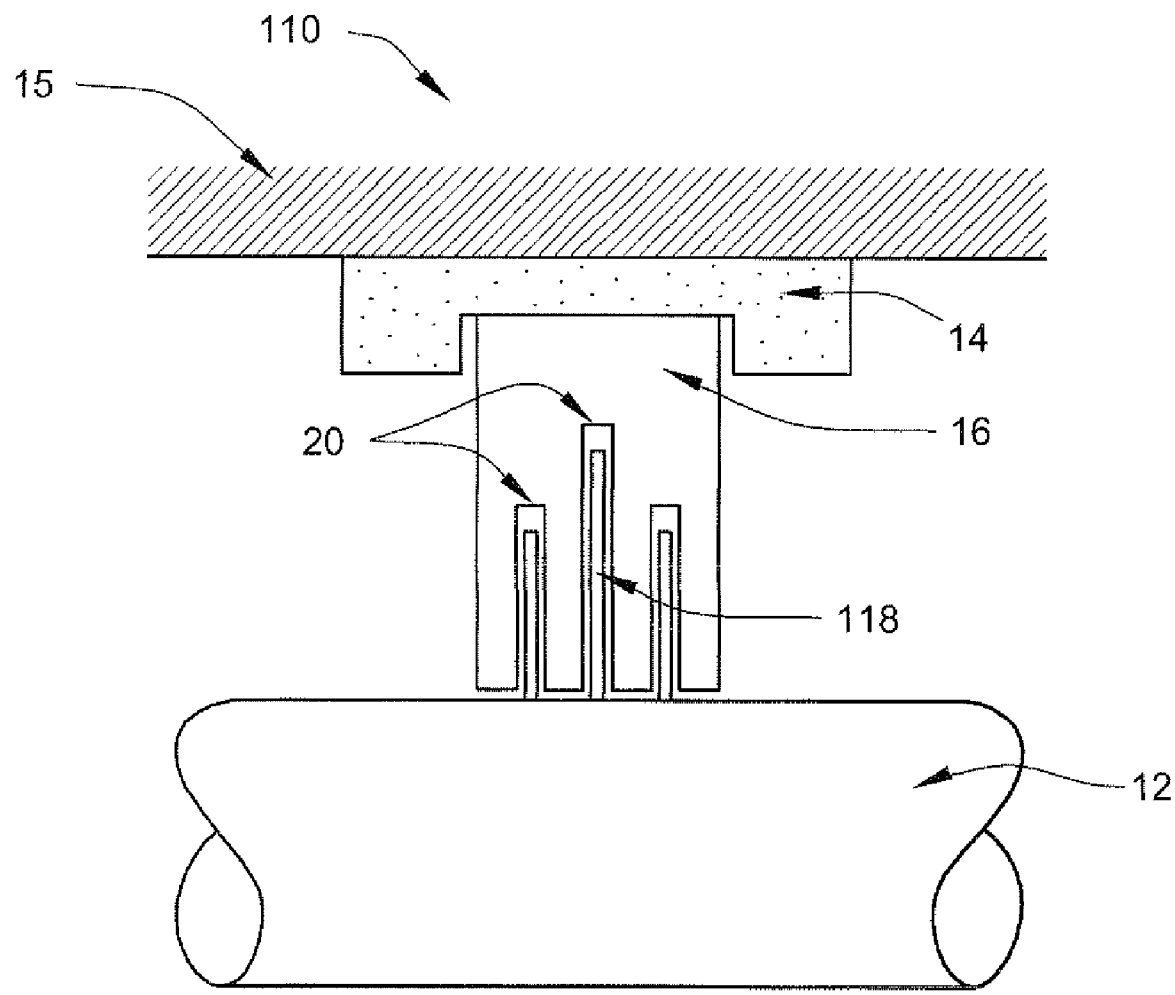
FIGS. 5-8 illustrate alternative embodiments of the compliant plate seal.

FIGS. 5-8 illustrate alternative embodiments of the compliant plate seals. In FIG. 5, while the compliant plate members 16 of the seal 110 are attached to the housing 14, which in turn is assembled with the stator 15, the axial flow resistance member or members 118 are attached to the rotor 12 instead of to the seal housing or stator 15.

Figure 6:
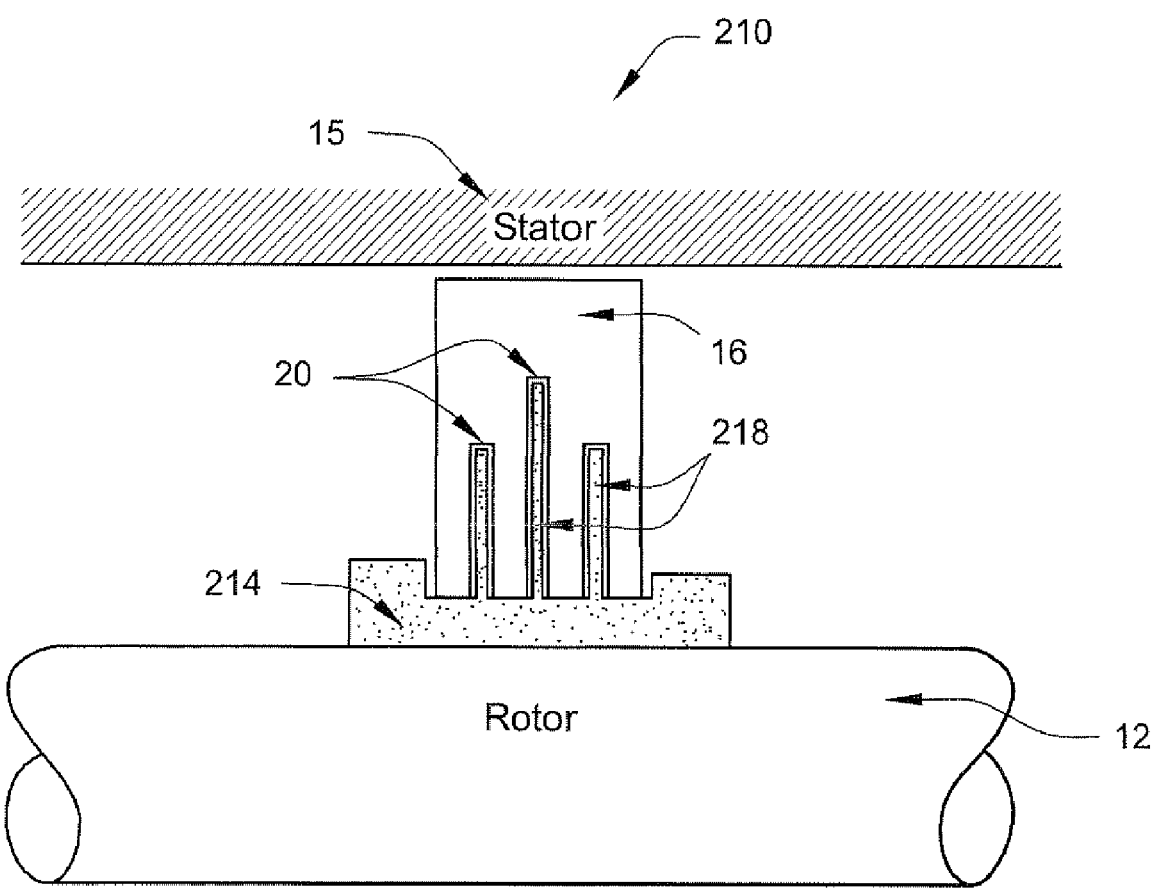

In FIG. 6, the compliant plate members 16 of the seal 210 are attached to the housing 214, which in turn is assembled with the rotor 12 instead of the stator 15. In this embodiment, the roots of the compliant plate members 16 are in proximity to the rotor 12, while the tips are in proximity to the stator 15. The axial flow resistance member or members 218 may be attached either to the rotor 12 directly or to the housing 214 attached to the rotor 12.

Figure 7:
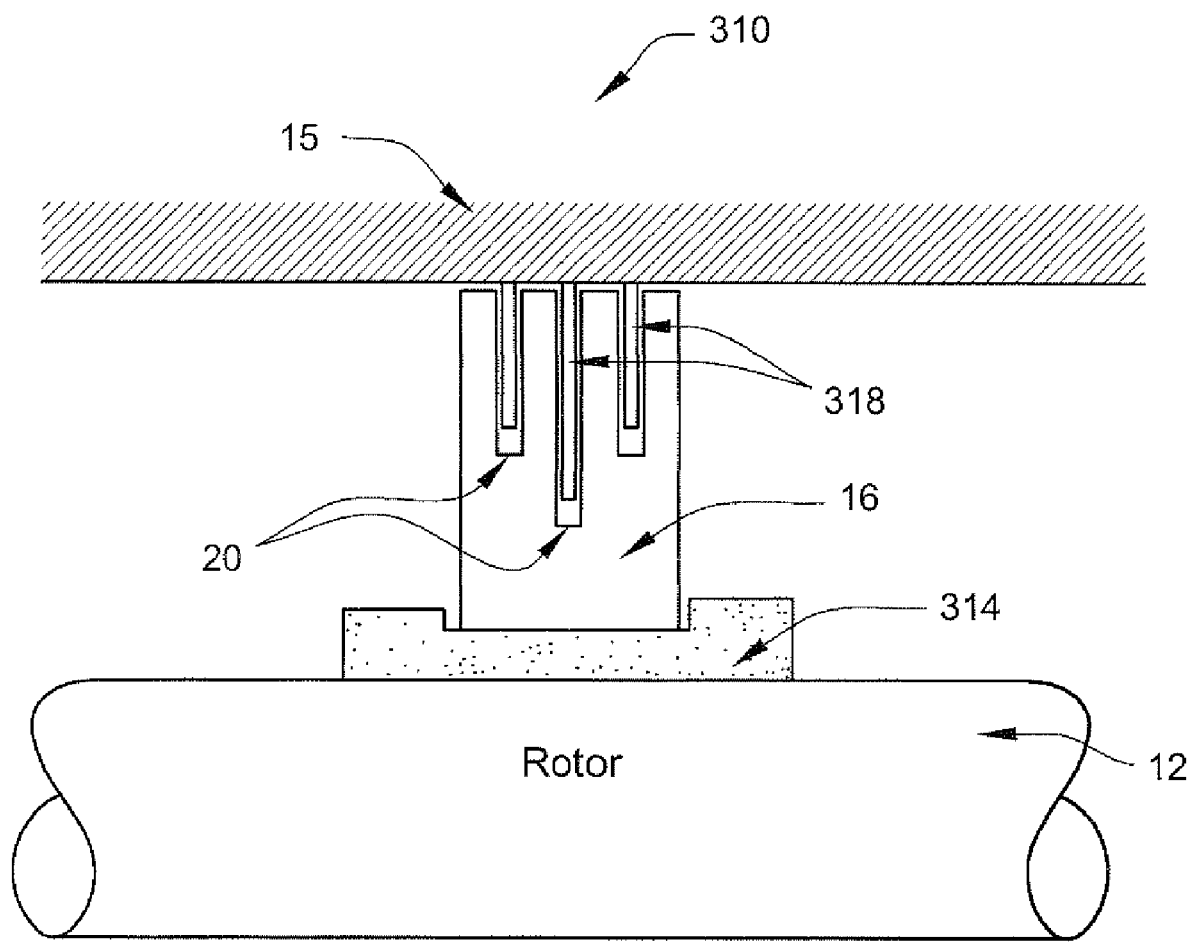

In yet another embodiment, with reference to FIG. 7, the compliant plate members 16 of the seal 310 are attached to the housing 314, which in turn is assembled with the rotor 12 rather than the stator 15. Similar to the embodiment illustrated in FIG. 6, the roots of the compliant plate members 16 are in proximity to the rotor 12, while the tips are in proximity to the stator 15. In this embodiment, however, the axial flow resistance member or members 318 are attached to the stator 15 and are therefore static.

Figure 8:
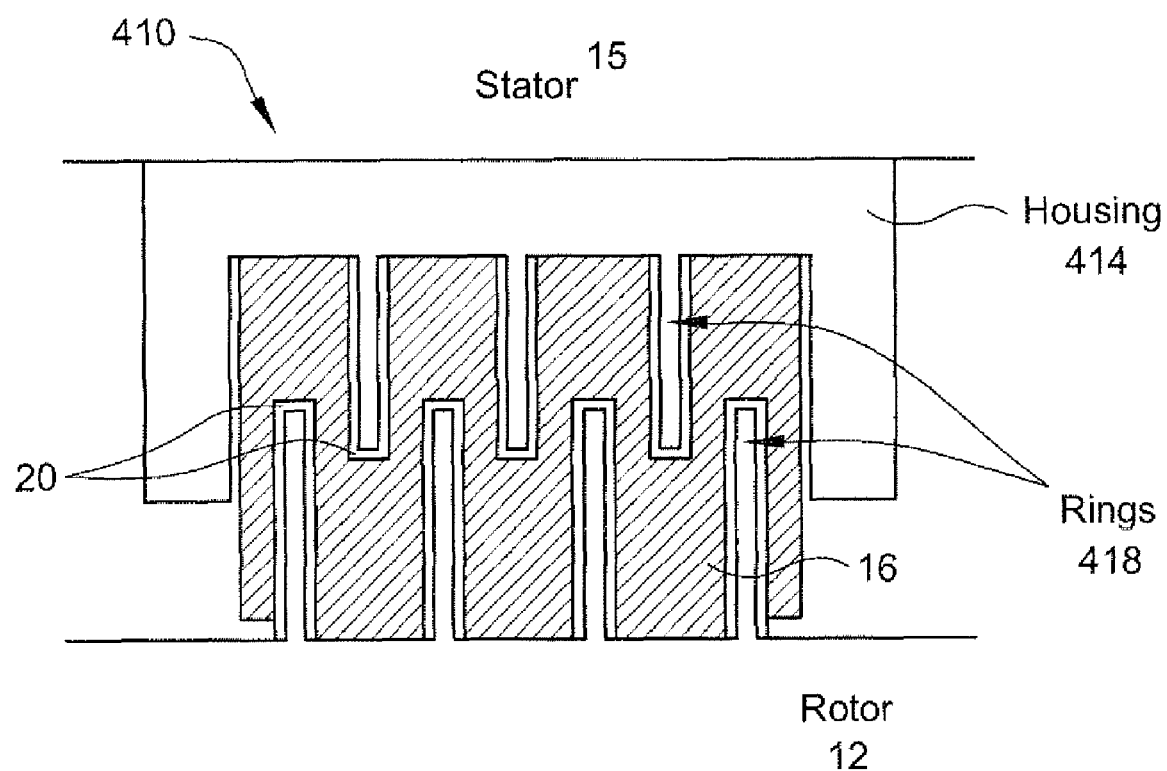

In yet another embodiment, shown in FIG. 8, the compliant plate members 16 of the seal 410 are attached to the housing 414, which in turn is assembled with the stator 15. In this embodiment, the roots of the compliant plate members 16 are in proximity to the stator 15, while the tips are in proximity to the rotor 12. The seal 410 includes two sets of axial flow resistance members 418. As shown, one set is attached to the stator 15 directly, or via a housing 414, and is therefore static. The other set of axial flow resistance members 418 is attached to the rotor 12 and therefore rotate along with the rotor 12.

An important advantage of compliant plate seals is a pressure build-up effect that is generated upon rotor rotation. The effect causes the compliant plates 16 to lift during rotor rotation. In response to this lift, any other pressure forces, and compliant plate material elasticity, an equilibrium state is attained for each compliant plate that leaves a very small clearance between the plate tips and the rotor. This small clearance between the plate tips and the rotor reduces frictional heat generation by minimizing or eliminating physical contact.

Although a housing is shown in the figures and described above, compliant plates and rings may directly be integrated with the stator or rotor, depending on the application. An intermediate housing may be necessary only for practical purposes such as assembly and fabrication and not for functionality. Additionally, although front and back rings 22, 24 are shown in some of the figures, the proposed configuration with the rings disposed within the compliant plates should achieve the desired objective without a need for front and back rings. In addition to the described features, the front and back rings can also be added to the seal. Typically, the front and back rings 22, 24 will be part of the housing as shown in FIG. 1.

The figures show a stator that is external to a rotor. In another arrangement, the rotor can be external to the stator.

The compliant plates may be coated with special materials to achieve one or more of the following objectives (without limitation): minimize friction, wear and heat generation in case of relative sliding, act as diffusion barrier, and allow high temperature operation. The surface of the rotor, which is in close proximity to the compliant plate tips may also be coated for the above or other reasons. Common coating methods include Physical Vapor Deposition, thermal spray and galvanic deposition, to name a few. Coating materials include, but are not limited to, Titanium Nitride, Zirconium Nitride, NickelChrome-ChromeCarbide along with solid lubricants, Nickel, etc.

The shaft seal described herein provides a high-pressure dynamic seal between a rotating component and a static component. The seal includes multiple compliant plates that comply in the event of rotor excursion but are very stiff along the direction of pressure drop. Incorporation of an axial flow resistance member forces the axial flow to follow a tortuous path at the seal root. A combination of tightly packed seal tips and flow obstructing features at the seal root results in a significantly reduced axial leakage.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A shaft seal for reducing leakage between a rotating shaft and a static shell, the shaft seal comprising:
   a plurality of compliant plate members attached in facing relation to one of the static shell and the rotating shaft, the compliant plate members defining a sealing ring between the static shell and the rotating shaft, wherein each of the compliant plate members comprises at least one slot therein disposed entirely within an axial width of the compliant plate members along an entire radial length of the compliant plate members; and
   at least one slot ring attached to at least one of the static shell and the rotating shaft and extending radially into the at least one slot in the compliant plate members.

2. A shaft seal according to claim 1, wherein each of the compliant plate members comprises multiple slots therein disposed between the side edges, and wherein the shaft seal further comprises corresponding multiple slot rings attached to one of the static shell and the rotating shaft and extending radially into each of the slots, respectively.

3. A shaft seal according to claim 1, wherein the compliant plate members are attached to the one of the static shell and the rotating shaft via a housing.

4. A shaft seal according to claim 3, wherein the at least one slot ring is integrated with the housing.

5. A shaft seal according to claim 1, wherein the at least one slot ring is attached to the rotating shaft.

6. A shaft seal according to claim 1, wherein the compliant plate members are attached to the rotating shaft, and wherein the at least one slot ring is attached to the rotating shaft.

7. A shaft seal according to claim 6, wherein the compliant plate members are attached to the rotating shaft via a housing.

8. A shaft seal according to claim 1, wherein the compliant plate members are attached to the rotating shaft, and wherein the at least one slot ring is attached to the static shell.

9. A shaft seal according to claim 8, wherein the compliant plate members are attached to the rotating shaft via a housing.

10. A shaft seal according to claim 1, comprising a plurality of slot rings, wherein the compliant plate members are attached to the static shell, and wherein at least one of the plurality of slot rings is attached to each of the static shell and the rotating shaft.

11. A shaft seal according to claim 1, wherein the at least one slot ring is directly attached to the at least one of the static shell and the rotating shaft.

12. A shaft seal for reducing leakage between a rotating shaft and a static shell, the shaft seal comprising:
a plurality of compliant plate members, each having a root and a tip, the compliant plate members being secured at their root in facing relation to one of the static shell and the rotating shaft, the complaint plate members each having an axial width and a radial length, wherein the tips of the compliant plate members are arranged circumferentially about the rotating shaft if the compliant plate members are secured to the static shell, and wherein the tips of the compliant plate members are arranged circumferentially about the static shell if the compliant plate members are secured to the rotating shaft; and
an axial flow resistance member disposed entirely within the axial width of the compliant plate members along the entire radial length of the compliant plate members, the axial flow resistance member serving as a barrier to axial leakage flow between the compliant plate members.

13. A shaft seal according to claim 12, wherein the compliant plate members are shaped such that the compliant plate member roots are packed more loosely than the compliant plate member tips, and wherein the axial flow resistance member mimics a labyrinth seal near the compliant plate member roots.

14. A shaft seal according to claim 13, wherein each of the compliant plate members comprises a plurality of slots therein adjacent the compliant plate member roots defining a corresponding plurality of circumferential slots in the sealing ring, and wherein the axial flow resistance member comprises a plurality of slot rings disposed in the circumferential slots.

15. A shaft seal according to claim 14, wherein the slot rings extend radially into the circumferential slots from at least one of the static shell and the rotating shaft.

16. A shaft seal according to claim 15, wherein the slot rings extend radially into the circumferential slots from the rotating shaft.

17. A shaft seal according to claim 12, wherein the compliant plate members are secured to the rotating shaft.

18. A shaft seal according to claim 17, wherein each of the compliant plate members comprises a plurality of slots therein adjacent the compliant plate member roots defining a corresponding plurality of circumferential slots in the sealing ring, and wherein the axial flow resistance member comprises a plurality of slot rings disposed in the circumferential slots, the slot rings extending radially into the circumferential slots from the static shell.

19. A shaft seal according to claim 12, wherein each of the compliant plate members comprises a plurality of slots therein defining a corresponding plurality of circumferential slots in the sealing ring, wherein the axial flow resistance member comprises a plurality of slot rings, wherein the compliant plate members are attached to the static shell, and wherein at least one of the plurality of slot rings is attached to each of the static shell and the rotating shaft and extend radially into the circumferential slots from the static shell and the rotating shaft, respectively.

20. A shaft seal according to claim 12, wherein the compliant plate members are attached to the one of the static shell and the rotating shaft via a housing.

21. A shaft seal for reducing leakage between a rotor and a stator in turbomachinery, the shaft seal comprising:
a plurality of compliant plate members attached in facing relation to one of the stator and the rotor, the compliant plate members defining a sealing ring between the stator and the rotor, wherein each of the compliant plate members comprises a plurality of varying length slots therein; and
a corresponding plurality of slot rings attached to at least one of the stator and the rotor and extending radially into the plurality of slots in the compliant plate members, respectively, the plurality of slot rings having varying radial lengths corresponding to the varying length slots and serving as a barrier to axial leakage flow between the compliant plate members.

* * * * *

UNITED STATES PATENT AND TRADEMARK OFFICE
CERTIFICATE OF CORRECTION

| | | |
|---|---|---|
| PATENT NO. | : 8,382,119 B2 | |
| APPLICATION NO. | : 12/140708 | |
| DATED | : February 26, 2013 | |
| INVENTOR(S) | : Awtar et al. | |

It is certified that error appears in the above-identified patent and that said Letters Patent is hereby corrected as shown below:

Title page of Patent No. 8,382,119 at INID Code (57), Line 9, delete "harrier" and insert --barrier--

Signed and Sealed this
Ninth Day of April, 2013

Teresa Stanek Rea
*Acting Director of the United States Patent and Trademark Office*